United States Patent Office 3,222,368
Patented Dec. 7, 1965

3,222,368
METHYLSULFINYLMETHYL KETONE DERIVATIVES OF SUBSTITUTED QUINOLIZINES
Richard E. Brown, Hanover, and Robert I. Meltzer, Rockaway, N.J., assignors to Warner-Lambert Pharmaceutical Company, Morris Plains, N.J., a corporation of Delaware
No Drawing. Filed Feb. 16, 1965, Ser. No. 433,166
5 Claims. (Cl. 260—289)

This invention relates to a composition of matter and relates more particularly to 1-methylsulfinylmethyl ketone derivatives of the formula:

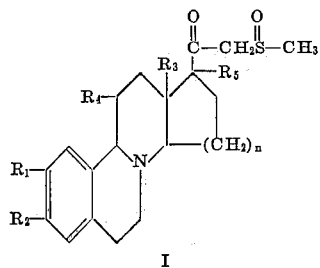

I and

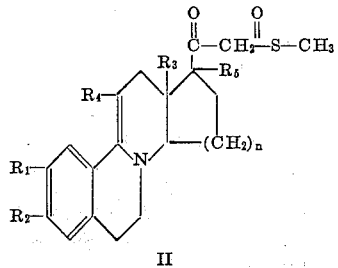

II wherein $R_1$ and $R_2$ each represents hydrogen, hydroxy or lower alkoxy such as methoxy, ethoxy, propoxy or methylene dioxy; $R_3$ represents hydrogen or lower alkyl such as methyl or ethyl, and $R_4$ and $R_5$ may be hydrogen or hydroxy, and $n$ is an integer of 1 or 2.

This invention also includes within its scope a novel process for the production of the above compounds.

The symbols $R_1$, $R_2$, $R_3$, $R_4$, $R_5$ and $n$ as used hereinafter have the same meaning as defined.

The compounds of the invention, when $n$ is one, have the following numbering system:

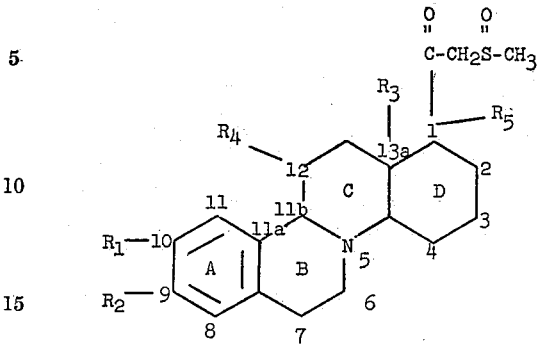

and when $n$ is 2, the compounds are numbered in the following manner:

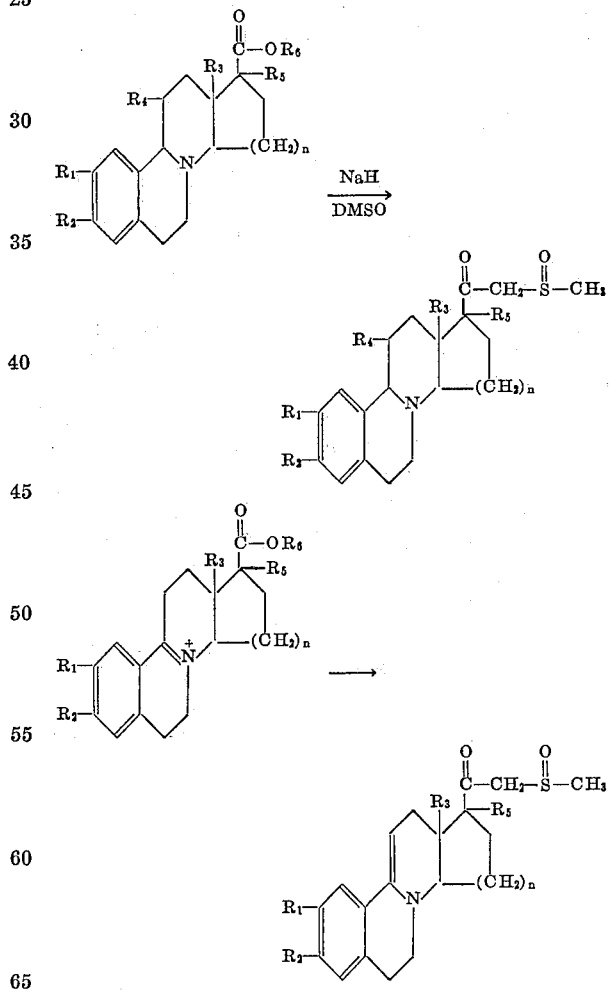

The compounds of this invention are useful as cardiovascular agents and are useful in endocrine therapy, including anti-fertility. In addition, they are useful as intermediates for the production of other substituted quinolizines.

According to the present invention, these novel compounds are prepared according to the following equation:

In the above equation $R_6$ represents arylalkyl such as benzyl or lower alkyl such as methyl, ethyl, isopropyl, isobutyl and the like.

The above reactions are effected by treating the appropriate starting material with dimethylsulfoxide in a suitable solvent such as dry tetrahydrofuran at a temperature of about 0 to 10° C. in the presence of a suitable base such as sodium or potassium hydride.

The reaction product formed is recovered by filtration techniques. The starting material used in the above reactions are prepared according to copending application Serial No. 248,872 filed January 2, 1963.

For therapeutic use, these compounds either alone or in combination with an inert pharmaceutical carrier may be formulated into such dosage forms such as tablets, suspensions, capsules, solutions, suppositories and the like. The active ingredient may be present in an amount of from 1 to 100 mg./dosage unit. They may also be combined with other therapeutic agents such as analgesics, tranquilizers, antacids, antibiotics and the like to extend and enhance their therapeutic spectrum.

In order to further illustrate the invention, the following examples are given. All temperatures are given in degrees centigrade.

*Example 1*

A mixture of 25 ml. of dry dimethylsulfoxide and 1.2 g. of a 50% suspension of sodium hydride in mineral oil is warmed gently under nitrogen until a clear solution is obtained (about 15 minutes). The solution is cooled to 0° and 20 ml. of dry tetrahydrofuran is added. This is followed by the addition with stirring of a solution of 2.0 g. of 1,2,3,3a,5,6,10b,11,12,12a-decahydro-1-carbethoxy - 8 - methoxy - 12a-methyl-11-hydroxybenz[a]cyclopenta[f]quinolizine in 20 ml. of dry tetrahydrofuran over a 10 minute period. After the addition is complete, the ice bath is removed and the reaction allowed to stir for 1½ hours while the temperature is permitted to rise. The mixture is then cooled to 10°, and 10 ml. of water is added dropwise. The reaction mixture is evaporated under a partial vacuum to remove the tetrahydrofuran. The solution is then diluted with 200 ml. of water and acidified with 4 N HCl. This solution is extracted twice with petroleum ether to remove mineral oil, then made basic to pH 8–9 with 5% sodium hydroxide solution. The mixture is extracted well with methylene chloride. The organic phase is dried and evaporated to give 1,2,3,3a,5,6,10b,11,12,12a - decahydro-8 - methoxy-12a-methyl-1 - [(methylsulfinyl)acetyl]benz[a]cyclopenta[f]quinolizin-11-ol as a solid, M.P. 152–4° after recrystallization from acetonitrile.

*Example 2*

In the same reaction as described in Example 1, 4.0 g. of 1,2,3,3a,5,6,10b,11,12,12a-decahydro-1-carbomethoxy-1-hydroxy - 8 - methoxy-12a-methylbenz[a]cyclopenta[f]quinolizine gives 1,2,3,3a,5,6,10b,11,12,12a-decahydro-8-methoxy - 12a-methyl-1-[(methylsulfinyl)acetyl]-benz[a]cyclopenta[f]quinolizine-1-ol as a white solid, M.P. 177–9° from acetonitrile.

*Example 3*

On the same reaction as described in Example 1, 50 g. of 1,2,3,3a,5,6,10b,11,12,12a-decahydro-1-carbethoxy-8-methoxy - 12a - methyl - benz[a]cyclopenta[f]quinolizine gives 1,2,3,3a,5,6,10b,11,12,12a - decahydro-8-methoxy-12a - methyl - 1 - [(methylsulfinyl)acetyl]benz[a] - cyclopenta[f]quinolizine as a white solid, M.P. 113–15° from acetonitrile.

*Example 4*

In the same reaction as described in Example 1, 4.42 g. of 2,3,3a,5,6,11,12,12a - octahydro - 1 - carbethoxy-8-methoxy-12a-methyl-1H-benz[a]cyclopenta[f]quinolizinium perchlorate gives 1,2,3,3a,5,6,12,12a - octahydro - 8 - methoxy - 12a - methyl - 1-[(methylsulfinyl)acetyl]-benz[a]cyclopenta[f]quinolizine as a solid, M.P. 145–55° from acetonitrile.

It is to be understood that the foregoing detailed description is given merely by way of illustration and that many variations may be made therein without departing from the spirit of our invention.

Having described our invention, what we desired to secure by Letters Patent is:

1. A compound selected from the group consisting of those of the formula:

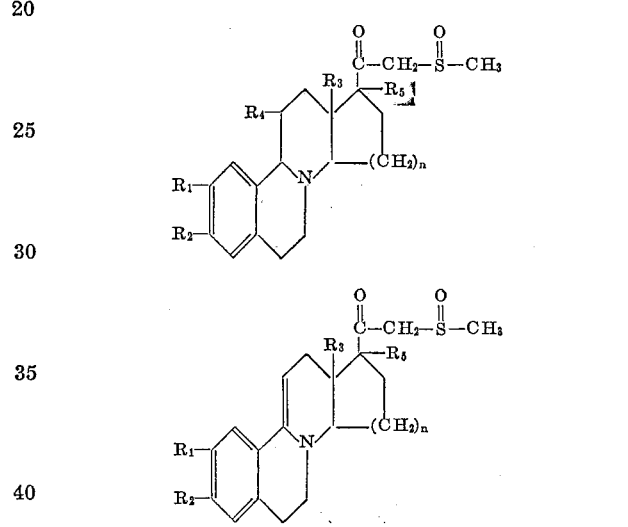

wherein $R_1$ and $R_2$ each is a member selected from the group consisting of hydrogen, hydroxy, and lower alkoxy, $R_3$ is a member selected from the group consisting of hydrogen and lower alkyl, and $R_4$ and $R_5$ is each a member of the group consisting of hydrogen and hydroxy, and $n$ is an integer of from 1 to 2.

2. 1,2,3,3a,5,6,10b,11,12,12a - decahydro - 8 - methoxy-12a-methyl-1-[(methylsulfinyl)acetyl]benz[a]cyclopenta-[f]quinolizin-11-ol.

3. 1,2,3,3a,5,6,10b,11,12,12a - decahydro - 8 - methoxy-12a - methyl - 1 - [(methylsulfinyl)acetyl]-benz[a]cyclopenta[f]quinolizine-1-ol.

4. 1,2,3,3a,5,6,10b,11,12,12a - decahydro - 8 - methoxy-12a-methyl-1-[(methylsulfinyl)acetyl]benz[a]cyclopenta[f]quinolizine.

5. 1,2,3,3a,5,6,12,12a - octahydro - 8 - methoxy - 12a-methyl - 1 - [(methylsulfinyl)acetyl]benz[a]cyclopenta[f]quinolizine.

No references cited.

NICHOLAS S. RIZZO, *Primary Examiner.*

DONALD G. DAUS, *Assistant Examiner.*